US012659296B2

(12) United States Patent
Kashyap et al.

(10) Patent No.: US 12,659,296 B2
(45) Date of Patent: Jun. 16, 2026

(54) MANAGING TRAFFIC IN NETWORKS THAT USE ZERO TRUST NETWORK ACCESS

(71) Applicant: Sophos Limited, Abingdon (GB)

(72) Inventors: Tejas Venkatesh Kashyap, Bangalore (IN); Venkata Suresh Reddy Obulareddy, Bangalore (IN)

(73) Assignee: Sophos Limited (GB)

( * ) Notice: Subject to any disclaimer, the term of this patent is extended or adjusted under 35 U.S.C. 154(b) by 5 days.

(21) Appl. No.: 18/800,876

(22) Filed: Aug. 12, 2024

(65) Prior Publication Data

US 2026/0006002 A1     Jan. 1, 2026

(30) Foreign Application Priority Data

Jun. 29, 2024     (IN) .............................. 202411050025

(51) Int. Cl.
*H04L 9/00*          (2022.01)
*H04L 9/40*          (2022.01)

(52) U.S. Cl.
CPC ...... *H04L 63/0236* (2013.01); *H04L 63/0263* (2013.01); *H04L 63/029* (2013.01)

(58) Field of Classification Search
CPC .......................... H04L 63/029; H04L 63/0263; H04L 63/0236
USPC .......................................................... 726/11
See application file for complete search history.

(56) References Cited

U.S. PATENT DOCUMENTS

| | | | | |
|---|---|---|---|---|
| 2021/0226913 A1* | 7/2021 | Sinha | .................. | H04L 61/4511 |
| 2022/0191209 A1* | 6/2022 | Broda | .................. | H04L 63/102 |
| 2022/0210173 A1* | 6/2022 | Katmor | .............. | H04L 63/1416 |
| 2022/0286431 A1* | 9/2022 | Winn | .................. | H04L 61/4511 |
| 2023/0168911 A1* | 6/2023 | Lopez Pascual | ... | G06F 9/45558 718/1 |
| 2024/0348691 A1* | 10/2024 | Thakore | ................ | H04L 67/141 |
| 2024/0388514 A1* | 11/2024 | Petla | ..................... | H04L 43/062 |
| 2025/0220001 A1* | 7/2025 | Wang | .................. | H04L 63/0428 |
| 2026/0006002 A1* | 1/2026 | Kashyap | ............. | H04L 63/0236 |

OTHER PUBLICATIONS

Netskope, Netskope Client Configuration. Available at https://web.archive.org/web/20240808010316/https://docs.netskope.com/en/netskope-client-configuration/, dated Aug. 5, 2024.

* cited by examiner

*Primary Examiner* — Josnel Jeudy
(74) *Attorney, Agent, or Firm* — Danielson Legal LLC

(57)          ABSTRACT

Systems and methods for managing traffic in a network that uses Zero Trust Network Access (ZTNA). The method includes providing a ZTNA gateway in connectivity with a first network, providing a ZTNA agent on a first user device in connectivity with the first network, and analyzing, using at least one of the ZTNA gateway or the first user device, a communication between the ZTNA gateway and the first user device to determine whether the first user device is on the first network. The method further includes enabling the first device to access a first resource on the first network without tunneling traffic from the first user device to the ZTNA gateway upon determining the user device is on the first network.

15 Claims, 5 Drawing Sheets

300

INTERNET/ISP
316

302

ZTNA
GATEWAY
306

RESOURCE
308

318

304

USER DEVICE
310

ZTNA AGENT
312

BACKUP SERVER
314

MANAGING TRAFFIC IN NETWORKS THAT USE ZERO TRUST NETWORK ACCESS

CROSS REFERENCE TO RELATED APPLICATIONS

The present application claims the benefit of and priority to IN Pat. Appl. No. 202411050025, filed on Jun. 29, 2024, and titled "Managing traffic in networks that use zero trust network access," the disclosure of which is hereby incorporated by reference in its entirety.

TECHNICAL FIELD

The present application relates generally to systems and methods for monitoring network activity and, more particularly but not exclusively, to systems and methods for managing traffic in networks that use Zero Trust Network Access.

BACKGROUND

Zero Trust Network Access (ZTNA) is a security solution for providing access to remote computing resources. ZTNA is an alternative to virtual private networks (VPNs), and ZTNA provides stronger and more thorough security coverage. VPNs operate by, once granting a user access to a network, allowing the user unrestricted access to resources on the network. ZTNA, on the other hand, grants access to only specific applications or other resources on a network.

Organizations such as corporate entities commonly have an on-premise network associated with their physical headquarters, and one or more branch networks. An "on-premise" network may refer to a network within an organization that can be securely accessed and accessed only by employees. A public network, on the other hand, can be accessed by effectively anyone and is considered an untrusted network.

Using ZTNA, a user can securely access configured applications by tunneling traffic through the user's computing device. When an employee of an organization is within an on-premise network, tunnelling traffic in accord with ZTNA can cause performance issues due to latency. These performance issues occur because there are additional hops from the application server hosting the resource to the ZTNA gateway, and back to the employee's computing device.

A need exists, therefore, for systems and methods that overcome these disadvantages of ZTNA.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

The disclosed embodiments provide novel techniques for managing traffic in networks that use ZTNA. A ZTNA gateway (e.g., a firewall device configured with ZTNA functionality) may be in connectivity with a first user device. The embodiments herein may analyze a communication between a ZTNA agent on the first user device and the ZTNA gateway. This may include a communication from the ZTNA agent to the ZTNA gateway, for example.

The analysis may be to determine whether the first user device is on the same network as a resource. Upon determining that the first user device is on the same network as the resource, the embodiments herein enable the first user device to access the resource without tunneling traffic from the first user device to the ZTNA gateway.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
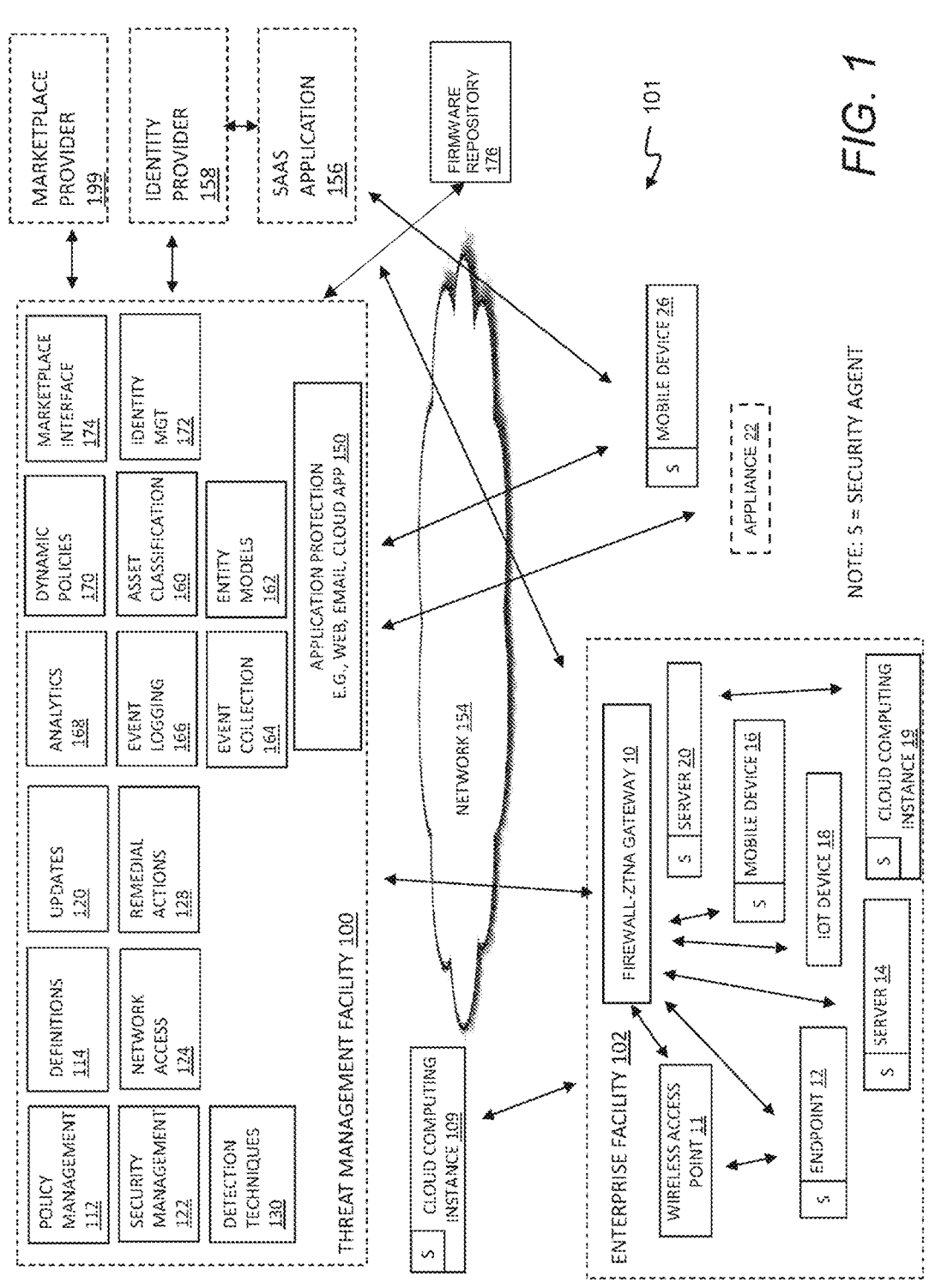
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Enterprises such as corporate entities are increasingly adopting ZTNA-based solutions for managing traffic on their networks. A corporation may have multiple locations from which their employees work (e.g., a headquarter location and one or more branch locations). The corporation may adopt ZTNA as a security solution for managing traffic associated with workers and computing devices on or across the networks associated with these locations. The rise of remote work has further exacerbated the need for securing networks, as employees or even malicious actors may try to access corporate resources from public, non-secured networks.

ZTNA-based solutions may be described as "perimeterless" as there are no clear perimeters with the advent of remote work. In accordance with VPN, for example, once a device accessed or otherwise was on a network and therefore "inside the network perimeter," the device was assumed to be trustworthy and allowed to access resources without limitation.

ZTNA-based solutions, on the other hand, recognize there is no single, defined network perimeter. Accordingly, ZTNA uses several different layers of security to protect network resources. ZTNA may use security techniques such as routinely authenticating user devices and securing traffic or communications.

While these routine authentications in theory protect a network and resources and users thereon, they may become redundant or unnecessary and contribute to latency for a user. If a user is on an on-premise network and attempts to access a resource that is also on-premise, the user may experience a prohibitively long delay before they able to download or otherwise access the resource. To authenticate, traffic from a user has to go to a cloud service and come back to the on-premise network, even if the user is on-premise. This traffic traversal also contributes to network latency.

In addition to latency-related issues, internet bandwidth can be expensive in certain geographic areas. When users access resources via ZTNA, this access occurs via a Wide-Area Network (WAN) even though resources may be hosted internally. This requires using WAN bandwidth.

The embodiments herein provide novel techniques for managing traffic on a network that uses ZTNA. A ZTNA gateway associated with a network and a ZTNA agent executing on a user device may communicate with each other such as part of a request to access a network resource. The embodiments herein may use one or more of a variety of techniques for determining whether the user device is on-premise (i.e., on the network on which the resource is located) or off-premise, such as on a branch network or in some other type of remote environment.

Upon determining that the user device is on-premise, the user device may access the resource without tunneling traffic from the user device to the ZTNA gateway, and without compromising the security of a network or devices thereon. This allows the device to access the resource more quickly, as the device isn't required to undergo multiple hops or otherwise access the resource through the ZTNA gateway.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall-ZTNA gateway 10, a wireless access point 11, an endpoint 12, a server 14, a mobile device 16, an appliance or Internet-of-Things (IoT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include or otherwise be in communication certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, a firmware repository 176, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall-ZTNA gateway 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an network 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall-ZTNA gateway 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall-ZTNA gateway 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall-ZTNA gateway 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall-ZTNA gateway 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall-ZTNA gateway 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall-ZTNA gateway 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall-ZTNA gateway 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall-ZTNA gateway 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall-ZTNA gateway 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
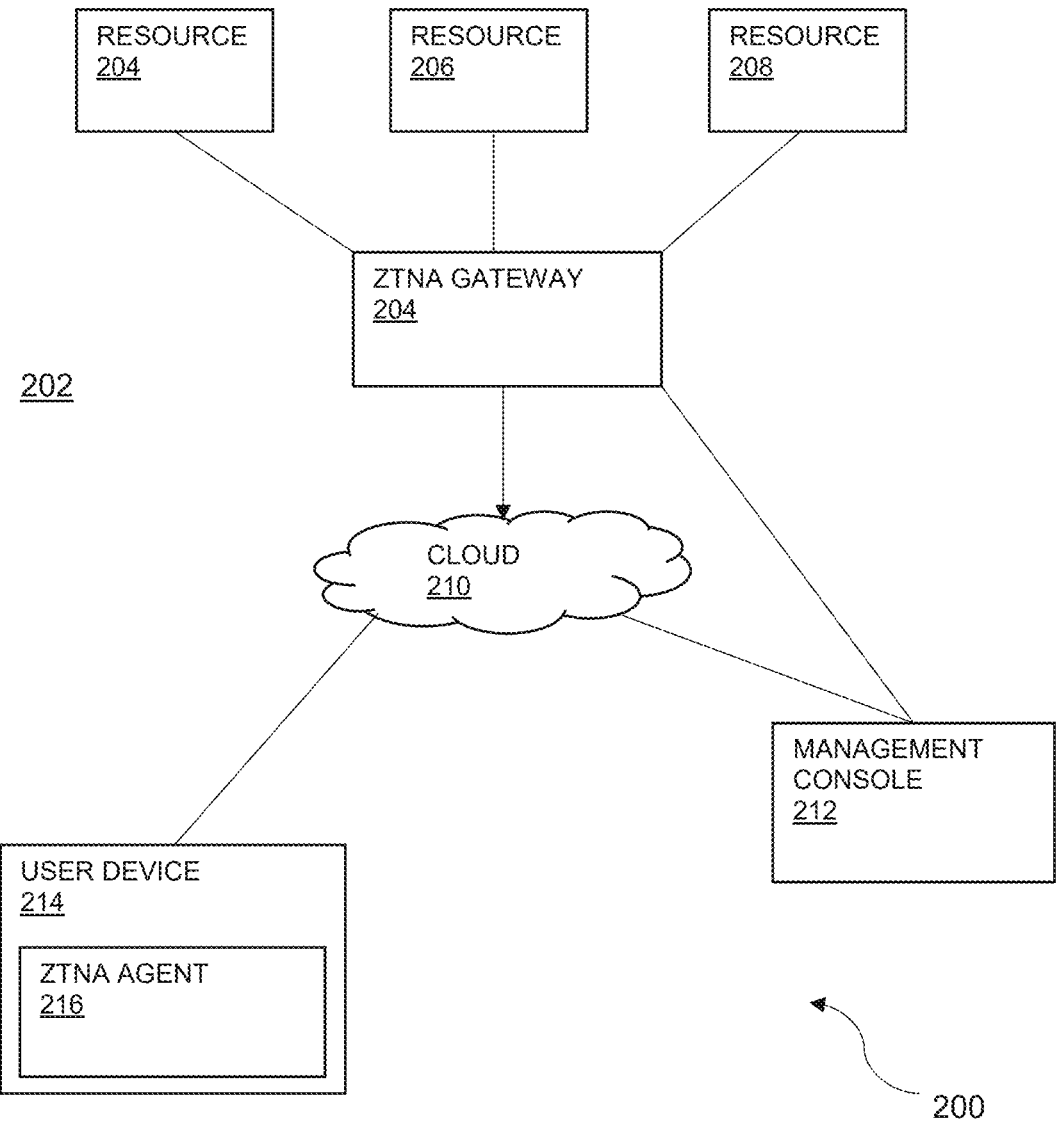
FIG. 2 illustrates a system for managing traffic in accordance with an existing technique.

FIG. 2 illustrates a system 200 for implementing an existing technique for managing traffic in a network that uses Zero Trust Network Access (ZTNA). In this existing technique, a system 200 may include or otherwise reside on an on-premise network 202 that hosts a ZTNA gateway 204 and one or more resources such as applications 204, 206, and 208. The system 200 may also include a cloud service 210, a management console 212, and one or more on-premise user devices 214 that each execute a ZTNA agent 216.

In operation, a user of the user device 214 may want to access one of the applications 204, 206, or 208. The user device 214 would need to have access to the cloud service 210 in order to access the desired application 204-08. Accordingly, the user device 214 would be unable to access the desired application 204-08 if the Internet or internet service provider (ISP) was down. Even if the Internet is functional, the ZTNA agent 216 of the user device 214 would still experience multiple hops through the cloud service 210 and the ZTNA gateway 204 before accessing the desired resource. These hops may cause latency or types of performance issues.

Figure 3:
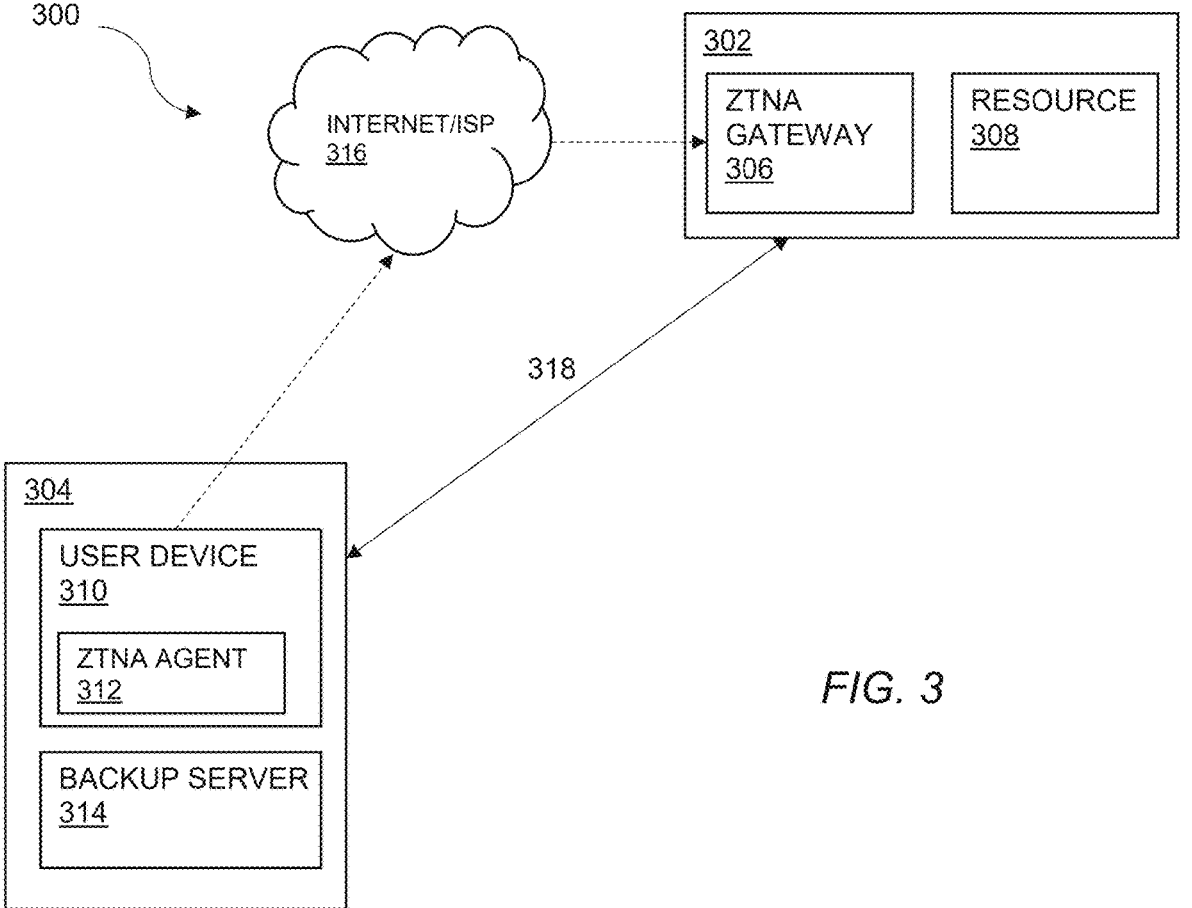
FIG. 3 illustrates a system for managing traffic in accordance with an existing technique.

FIG. 3 illustrates a system 300 for implementing another existing technique for managing traffic in a network that uses ZTNA. In this existing technique the system 300 may include or otherwise reside on an on-premise network 302 that is in communication with one or more branch networks 304. The on-premise network 302 may include an on-premise ZTNA gateway 306 and one or file servers or other types of applications or resources 308.

The branch network 304 may include one or more user devices 310 executing a ZTNA agent 312, and may also include a backup server 314. The on-premise network 302 and the branch network 304 may in communication with each other over the internet 316 and a private, leased line 318.

In operation, the user device 310 may wish to access the resource 308, such as an application on a file server. This request would be routed over the internet 316 to the ZTNA gateway 306. As the backup server 314 is located in the branch network 304 along with the user device 310, this configuration may lead to a "hair-pin" communication problem in the event the user device 310 tries to access the backup server 314 via the ZTNA gateway 306.

The system 300 of FIG. 3 also suffers from the drawbacks discussed above in conjunction with FIG. 2. That is, the user device 310 may be unable to access the desired resource 308 if the internet 316 or internet service provider (ISP) was down. Even if the internet 316 is functional, the ZTNA agent 312 of the user device 310 would still experience multiple hops over the Internet 316. These hops may cause latency or otherwise performance issues for the user of the user device 310.

The embodiments described herein provide novel techniques for managing traffic in networks that use ZTNA. The embodiments herein reduce latency by avoiding tunneling through a ZTNA gateway when a user device tries to access a resource from an on-premise network.

The embodiments herein first determine whether a user device is on the network that is hosting the desired resource. Upon determining that the user device is on the network, the embodiments herein can allow the user device to access the resource by avoiding the hop(s) associated with the ZTNA gateway. On the other hand, if the user device is on a branch network or otherwise remote from the network hosting the resource, the request will be tunneled through the ZTNA gateway.

Figure 4:
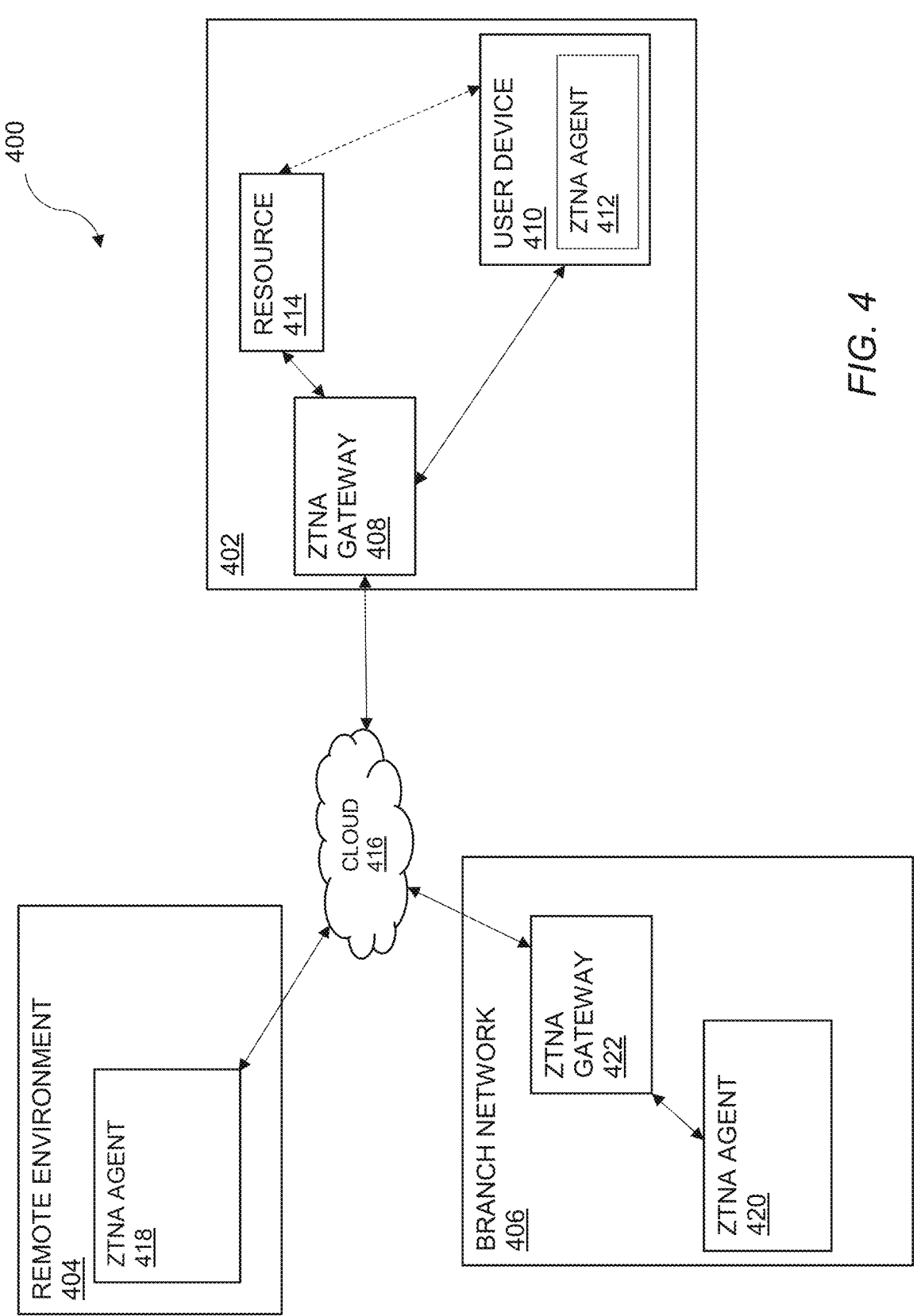
FIG. 4 illustrates a system for managing traffic in a system that uses Zero Trust Network Access (ZTNA) in accordance with one embodiment.

FIG. 4 illustrates a system 400 for managing traffic in a network that uses ZTNA in accordance with one embodiment. The system 400 may include an on-premise network 402, a remote environment 404, and a branch network 406. The on-premise network 402 may include a firewall-ZTNA gateway 408 such as the firewall-ZTNA gateway 10 of FIG. 1 (for simplicity, "ZTNA gateway 408"), a user device 410 executing a ZTNA agent 412, and resource 414.

The on-premise network 402 may be in communication with the remote environment 404 and the branch network 406 over a cloud service 416, for example. The remote environment 404 and the branch network 406 may each include a ZTNA agent 418 and 420, respectively, executing on a user device. As seen in FIG. 4, the branch network 406 may also include a firewall-ZTNA gateway 422 (for simplicity, "ZTNA gateway 422").

In operation, the user device 410 may want to access resource 414. As discussed previously, tunneling traffic through the ZTNA agent 412 and the ZTNA gateway 408 may cause latency and a delay for the user of the user device 410 in accessing the resource 414.

The embodiments described herein may first determine whether the user device 410 is on-premise (i.e., on the network 402) or off-premise, such as in the remote environment 404 or on the branch network 406. If the user device 410 is located on-premise, the user device 410 can then access the resource 414 without tunneling traffic through the user device 410 and the ZTNA gateway 408. This also allows the user device 410 to access the resource even if the ISP/Internet is down.

Accordingly, for users or devices that are identified to be on-premise, the ZTNA agent associated with their user device can connect to the resource directly and bypass the ZTNA gateway. This is assuming that an administrator had previously configured the particular user device to not tunnel Fully Qualified Doman Names (FQDNs) on-premise.

This determination may be made in one or more of a variety of ways and may be based on one or more communications between the user device 410 and the ZTNA gateway 408. These techniques may be classified as Domain Name Service (DNS)-based, Dynamic Host Configuration Protocol (DHCP)-based, or firewall-based.

DNS-based approaches may be further classified into DNS server-based and DNS FQDN-based. In a DNS-based approach, an administrator may provide the ZTNA gateway 408 and the ZTNA agent 412 with a list of DNS servers to which the network 402 sends DNS requests. This list may be provided during configuration of the ZTNA gateway 408 and the user device 410, for example.

If the FQDN for which the user device 410 is resolved uses a DNS server that is on this list, it may be determined that the user device 410 is on-premise. This approach may be advantageous as the DNS server list is typically static and will not require subsequent or frequent updates. Additionally, there is no required configuration changes for future resource modifications (e.g., resulting from adding or deleting a resource).

In a DNS-FQDN approach, an administrator may first provide a list of pairs of DNS FQDNs and an associated internet protocol (IP) address. These pairs (e.g., in the form of "DNS FQDN, IP address") may be provided as a list during configuration of the ZTNA gateway 408, for example. Specifically, an administrator may configure an on-premise DNS server to return a fixed IP address for a particular FQDN. These details may be configured with or otherwise stored in a central management console or other network device (not shown in FIG. 4) so that they may be distributed to ZTNA agents of user devices.

An entry in the list should be a valid DNS record that is resolvable only when on the on-premise network 402. During the attempt to access the resource 414, the ZTNA agent 412 may determine that the user device 410 is on-premise if the DNS FQDN of the user device 410 resolves to the same IP address that is associated with the DNS FQDN in the provided list.

With this approach, configuring the ZTNA gateway 408 may be relatively simple as an administrator only needs to provide a list of DNS FQDNs and associated IP addresses. There will also be no required configuration changes to account for future FQDN additions or deletions.

In a DHCP approach, an administrator may configure the user device 410 with certain DHCP parameters. These may refer to parameters that are typically provided by a DHCP server to DHCP clients. These parameters may refer to settings provided to network devices that allow them to communicate with an enterprise's DHCP servers that are on an on-premise network. An administrator may configure a DHCP server with a particular pre-configured value(s). And configure the same value(s) in a management console (not shown in FIG. 4) so that it can be distributed to all user devices.

During an attempt to access the resource 414, the ZTNA agent 412 may determine the user device 410 is on-premise if the user device 410 has DHCP settings that match settings of a DHCP server (as obtained from the management console) or are otherwise configured with certain parameters. The ZTNA agent 412 may compare the value received from the DCHP server with the value obtained from the management console. If these values are matching, the ZTNA agent 412 may conclude the user device 410 is on-premise. This approach can also scale well using DHCP relays. Additionally, there are no required configuration changes to account for future FQDN additions or deletions.

In a firewall-based approach, the embodiments herein may leverage one or more communications between the ZTNA gateway 408 (which may include firewall functionality) and the ZTNA agent 412 to identify whether the user device 410 is behind the ZTNA gateway 408 and therefore on-premise. These communications may occur at predetermined intervals or whenever there is a status change of the user device 410.

In accordance with this technique, the user device 410 with ZTNA agent 412 may use public/private key cryptography to communicate to the ZTNA gateway 408 for verification. After verification is successful, a communication channel is established and allows the user device 410 to communicate data regarding the state of the user device 410.

This technique can detect whether the device 410 is on-premise or not. For example, if this communication channel is established, the ZTNA agent 412 considers it as on-premise, and may bypass the ZTNA tunnel for resources that are behind the firewall ZTNA gateway 408.

Accordingly, this technique may leverage existing mechanisms that are in place to facilitate communications between a firewall (i.e., the ZTNA gateway 408) and an existing device. This obviates the need for an administrator to make changes to the existing network or devices thereon.

Referring back to FIG. 4, a similar analysis may be performed on communications associated with ZTNA agents 418 and 420. However, these analyses will determine that the ZTNA agents 418 and 420 are off-premise, and will therefore need to access the resource 414 through the ZTNA gateway 408.

There may be a variety of options for bypassing tunneling once the ZTNA agent 412, the ZTNA gateway 408, or some combination thereof, determine that the user device 410 is on-premise. In some embodiments, the user device 410 may bypass the ZTNA gateway 408 completely. If desired, an administrator may configure the network 402 or devices thereon such that an on-premise user or user device 410 does not even need to authenticate or provide authorization to access the resource 414.

In some embodiments, there may be a single authentication or authorization required before the user device 410 can access the resource 414. That is, once the user device 410 is determined to be on-premise, it may need to provide authentication credentials before it can access the resource 414. Once authenticated, the user device 410 need not provide credentials again. This provides Zero Trust functionality, while also provide some level of security. The ZTNA gateway 408 or some other device or module may perform the authentication procedure.

Figure 5:
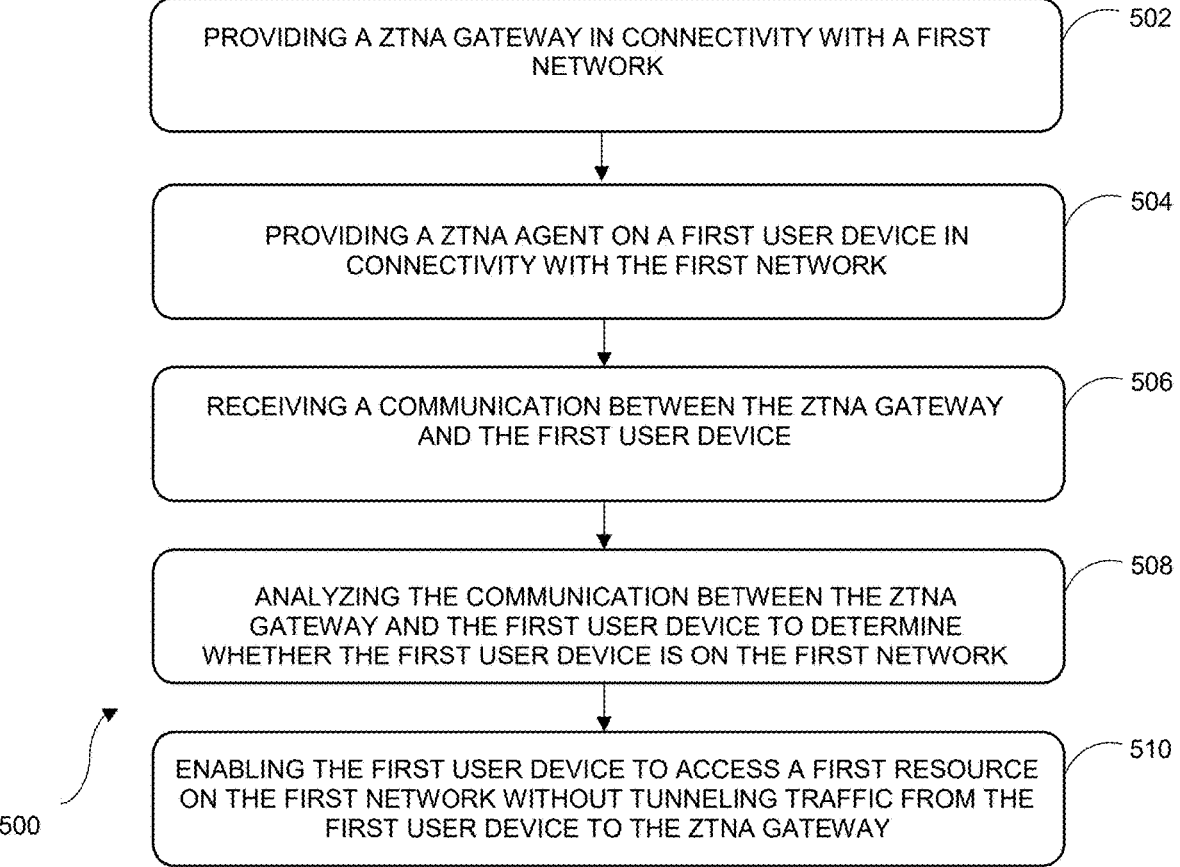
FIG. 5 depicts a flowchart of a method for managing traffic in a network that uses ZTNA in accordance with one embodiment.

FIG. 5 depicts a flowchart of a method 500 for managing traffic in a network that uses ZTNA in accordance with one embodiment. One or more components of the system 400 of FIG. 4 may perform the steps of method 500.

Step 502 involves providing a ZTNA gateway 408 in connectivity with a first network 402. Step 504 involves providing a ZTNA agent 412 on a first user device 410 in connectivity with the first network 402.

Step 506 involves receiving a communication between the ZTNA gateway 408 and the first user device 410. This communication may be sent from the first user device 410 to the ZTNA gateway 408 and may relate to, for example, the health of the first user device 410. The communication may also or instead include a request to access a resource 414.

Step 508 involves analyzing, using at least one of the ZTNA gateway 408 or the first user device 410, the communication between the ZTNA gateway 408 and the first user device 410 to determine whether the first user device 410 is on the first network 402.

Step 510 involves enabling the first user device 410 to access a first resource 414 on the first network 402 without tunneling traffic from the first user device 410 to the ZTNA gateway 408 upon determining the user device 410 is on the first network 402.

The embodiments herein provide novel techniques to achieve technical improvements in the field of network traffic management. Specifically, the embodiments herein provide improvements in managing traffic in networks that use ZTNA.

By selectively bypassing a ZTNA gateway based on device location and allowing the device to access an on-premise resource directly and without comprising security of a network or devices thereon, the embodiments herein preserve bandwidth and allow resource access more quickly than if a device had to access a resource through a ZTNA gateway. Additionally, on-premise user devices can still access on-premise resources in the event of an Internet failure.

In one aspect, embodiments relate to a method for managing traffic in a network that uses ZTNA. The method includes receiving, by a ZTNA gateway in connectivity with a first network or a ZTNA agent on a first user device in connectivity with the first network, a communication between the ZTNA gateway and the first user device; analyzing, using at least one of the ZTNA gateway or the first user device, the communication between the ZTNA gateway and the first user device to determine whether the first user device is on the first network; and enabling the first device to access a first resource on the first network without tunneling traffic from the first user device to the ZTNA gateway upon determining the user device is on the first network.

In some embodiments, the method further includes receiving, by the ZTNA gateway or a second user device, a communication between the ZTNA gateway and the second user device; analyzing, using at least one of the ZTNA gateway or the second user device, the communication between the second user device and the ZTNA gateway to determine whether the second user device is on the first network; and tunneling traffic from the second user device through the ZTNA gateway to access the first resource on the first network upon determining the second user device is not on the first network. In some embodiments, the first network is an on-premise network, and the second user device is on a branch network.

In some embodiments, analyzing the communication to determine whether the first user device is on the first network involves receiving a list of Domain Name System (DNS) servers, determining a fully qualified domain name (FQDN) associated with the first user device, and determining whether the FQDN associated with the first user device is resolved using a DNS server on the received list of DNS servers.

In some embodiments, analyzing the communication to determine whether the first user device is on the first network involves receiving a list of pairs of fully qualified domain names (FQDN) and Internet Protocol (IP) addresses, implementing a rule that an FQDN of the list is resolvable only on the first network, and determining that an FQDN associated with the first user device resolves to a valid DNS record.

In some embodiments, the communication received by the ZTNA gateway from the first user device includes a request from the first user device to access the first resource.

In some embodiments, analyzing the communication to determine whether the first user device is on the first network involves configuring a Dynamic Host Configuration Protocol (DHCP) server with a first setting, configuring the ZTNA agent on the first user device with the second setting, and determining that the second setting matches the first setting.

In some embodiments, analyzing the communication includes: performing a mutual verification procedure to authenticate the first user device and the ZTNA gateway, wherein the ZTNA gateway is configured with a firewall device; and allowing the first user device to bypass the ZTNA gateway after verifying the first user device and the ZTNA gateway.

In some embodiments, the ZTNA gateway is on the first network.

According to another aspect, embodiments relate to a system for managing traffic in a network in a network that uses Zero Trust Network Access (ZTNA). The system includes a ZTNA gateway in connectivity with a first network, and a first user device executing a ZTNA agent that is in communication with the ZTNA gateway, wherein at least one of the ZTNA gateway or the ZTNA agent are further configured to analyze a communication between the ZTNA gateway and first user device to determine whether the first user device is on the first network, and enable the first device to access a first resource on the first network without tunneling traffic from the first user device to the ZTNA gateway upon determining the user device is on the first network.

In some embodiments, the system further includes a second user device executing a ZTNA agent wherein at least one of the ZTNA gateway or the ZTNA agent of the second user device are configured to analyze a communication between the ZTNA gateway and the second user device to determine whether the second user device is on the first network and tunnel traffic from the second user device to the ZTNA gateway to access the first resource on the first network upon determining the second user device is not on the first network. In some embodiments, the first network is an on-premise network, and second device is on a branch network.

In some embodiments, at least one of the ZTNA gateway or the ZTNA agent analyzes the communication between the ZTNA gateway and the first user device to determine whether the first user device is on the first network by receiving a list of Domain Name System (DNS) servers, determining a fully qualified domain name (FQDN) associated with first user device, and determining whether the FQDN associated with the first user device is resolved using a DNS server on the received list of DNS servers.

In some embodiments, at least one of the ZTNA gateway or the ZTNA agent analyzes the communication between the ZTNA gateway and the first user device to determine whether the first user device is on the first network by receiving a list of pairs of fully qualified domain names (FQDN) and Internet Protocol (IP) addresses, implementing a rule that an FQDN of the list is resolvable only when on the first network, and determining that an FQDN associated with the first user device resolves to a valid DNS record.

In some embodiments, the communication between the ZTNA gateway and the first user device includes a request from the first user device to access the first resource.

In some embodiments, at least one of the ZTNA gateway of the ZTNA agent analyzes the communication between the ZTNA gateway and the first user device by determining that a parameter configured on a Dynamic Host Configuration Protocol (DCHP) server matches a parameter on the ZTNA agent.

In some embodiments, the ZTNA gateway and the first user device analyze the communication by: performing a mutual verification procedure to authenticate the first user device and the ZTNA gateway, wherein the ZTNA gateway is configured with a firewall device; and allowing the first user device to bypass the ZTNA gateway after verifying the first user device and the ZTNA gateway.

In some embodiments, the ZTNA gateway is on the first network.

According to yet another aspect, embodiments relate to computer program product for managing traffic in a network that uses Zero Trust Network Access (ZTNA). The computer program product comprising computer executable code embodied in one or more non-transitory computer readable media that, when executing on one or more processors, performs the steps of receiving, by a ZTNA gateway in connectivity with a first network or a ZTNA agent on a first user device in connectivity with the first network, a communication between the ZTNA gateway and the first user device; analyzing, using at least one of the ZTNA gateway or the first user device, the communication between the ZTNA gateway and the first user device to determine whether the first user device is on the first network; and enabling the first device to access a first resource on the first network without tunneling traffic from the first user device to the ZTNA gateway upon determining the user device is on the first network.

In some embodiments, the computer program product further comprises computer executable code that, when executing on one or more processors, performs the steps of receiving, by the ZTNA gateway in connectivity with a first network or a ZTNA agent on a first user device in connectivity with the first network, a communication between the ZTNA gateway and the second user device; analyzing, using at least one of the ZTNA gateway or the second user device, the communication between the second user device and the ZTNA gateway to determine whether the second user device is on the first network; and tunneling traffic from the second user device through the ZTNA gateway to access the first resource on the first network upon determining the second user device is not on the first network.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for managing traffic in a network that uses Zero Trust Network Access (ZTNA), the method comprising:

receiving, by a ZTNA gateway in connectivity with a first network or a ZTNA agent on a first user device in connectivity with the first network, a communication between the ZTNA gateway and the first user device, wherein the first network is an on-premise network;

analyzing, using at least one of the ZTNA gateway or the first user device, the communication between the ZTNA gateway and the first user device to determine whether the first user device is on the first network;

enabling the first user device to access a first resource on the first network without tunneling traffic from the first user device to the ZTNA gateway upon determining the user device is on the first network;

receiving, by the ZTNA gateway or a second user device, a communication between the ZTNA gateway ZTNA gateway and the second user device;

analyzing, using at least one of the ZTNA gateway or the second user device, the communication between the second user device and the ZTNA gateway to determine whether the second user device is on the first network; and tunneling traffic from the second user device through the ZTNA gateway to access the first resource on the first network upon determining the second user device is not on the first network and on a branch network.

2. The method of claim 1, wherein analyzing the communication to determine whether the first user device is on the first network involves:

receiving a list of Domain Name System (DNS) servers, determining a fully qualified domain name (FQDN) associated with the first user device, and determining whether the FQDN associated with the first user device is resolved using a DNS server on the received list of DNS servers.

3. The method of claim 1, wherein analyzing the communication to determine whether the first user device is on the first network involves:

receiving a list of pairs of fully qualified domain names (FQDN) and Internet Protocol (IP) addresses, implementing a rule that an FQDN of the list is resolvable only on the first network, and determining that an FQDN associated with the first user device resolves to a valid DNS record.

4. The method of claim 1 wherein the communication received by the ZTNA gateway from the first user device includes a request from the first user device to access the first resource.

5. The method of claim 1 wherein analyzing the communication to determine whether the first user device is on the first network involves:

configuring a Dynamic Host Configuration Protocol (DHCP) server with a first setting, configuring the ZTNA agent on the first user device with a second setting, and determining that the second setting matches the first setting.

6. The method of claim 1 wherein analyzing the communication includes:

performing a mutual verification procedure to authenticate the first user device and the ZTNA gateway, wherein the ZTNA gateway is configured with a firewall device, and allowing the first user device to bypass the ZTNA gateway after verifying the first user device and the ZTNA gateway.

7. The method of claim 1 wherein the ZTNA gateway is on the first network.

8. A system for managing traffic in a network that uses Zero Trust Network Access (ZTNA), the system comprising:

a ZTNA gateway in connectivity with a first network, wherein the first network is an on-premise network;

a first user device executing a ZTNA agent that is in communication with the ZTNA gateway, wherein at least one of the ZTNA gateway or the ZTNA agent are further configured to:

analyze a communication between the ZTNA gateway and first user device to determine whether the first user device is on the first network; and enable the first device to access a first resource on the first network without tunneling traffic from the first user device to the ZTNA gateway upon determining the user device is on the first network a second user device executing a ZTNA agent that is in communication with the ZTNA gateway, wherein at least one of the ZTNA gateway or the ZTNA agent of the second user device are configured to:

analyze a communication between the ZTNA gateway and the second user device to determine whether the second user device is on the first network; and tunnel traffic from the second user device to the ZTNA gateway to access the first resource on the first network upon determining the second user device is not on the first network.

9. The system of claim 8 wherein at least one of the ZTNA gateway or the ZTNA agent analyzes the communication between the ZTNA gateway and the first user device to determine whether the first user device is on the first network by:

receiving a list of Domain Name System (DNS) servers, determining a fully qualified domain name (FQDN) associated with first user device, and determining whether the FQDN associated with the first user device is resolved using a DNS server on the received list of DNS servers.

10. The system of claim 8 wherein at least one of the ZTNA gateway or the ZTNA agent analyzes the communication between the ZTNA gateway and the first user device to determine whether the first user device is on the first network by:

receiving a list of pairs of fully qualified domain names (FQDN) and Internet Protocol (IP) addresses, implementing a rule that an FQDN of the list is resolvable only when on the first network, and determining that an FQDN associated with the first user device resolves to a valid DNS record.

11. The system of claim 8 wherein the communication between the ZTNA gateway and the first user device includes a request from the first user device to access the first resource.

12. The system of claim 8 wherein at least one of the ZTNA gateway of the ZTNA agent analyzes the communication between the ZTNA gateway and the first user device by determining that a parameter configured on a Dynamic Host Configuration Protocol (DCHP) server matches a parameter on the ZTNA agent.

13. The system of claim 8 wherein the ZTNA gateway and the first user device analyze the communication by:

performing a mutual verification procedure to authenticate the first user device and the ZTNA gateway, wherein the ZTNA gateway is configured with a firewall device, and allowing the first user device to bypass the ZTNA gateway after verifying the first user device and the ZTNA gateway.

14. The system of claim 8 wherein the ZTNA gateway is on the first network.

15. A computer program product for managing traffic in a network that uses Zero Trust Network Access (ZTNA), the computer program product comprising computer executable code embodied in one or more non-transitory computer readable media that, when executing on one or more processors, performs the steps of:

receiving, by a ZTNA gateway in connectivity with a first network or a ZTNA agent on a first user device in connectivity with the first network, a communication between the ZTNA gateway and the first user device, wherein the first network is an on-premise network;

analyzing, using at least one of the ZTNA gateway or the first user device, the communication between the ZTNA gateway and the first user device to determine whether the first user device is on the first network;

enabling the first device to access a first resource on the first network without tunneling traffic from the first user device to the ZTNA gateway upon determining the user device is on the first network receiving, by the ZTNA gateway or a second user device, a communication between the ZTNA gateway ZTNA gateway and the second user device;

analyzing, using at least one of the ZTNA gateway or the second user device, the communication between the second user device and the ZTNA gateway to determine whether the second user device is on the first network; and tunneling traffic from the second user device through the ZTNA gateway to access the first resource on the first network upon determining the second user device is not on the first network and on a branch network.

\* \* \* \* \*